United States Patent
Debata et al.

(10) Patent No.: US 11,595,192 B2
(45) Date of Patent: Feb. 28, 2023

(54) SYSTEM AND METHOD OF MIGRATING ONE OR MORE STORAGE CLASS MEMORIES FROM A FIRST INFORMATION HANDLING SYSTEM TO A SECOND INFORMATION HANDLING SYSTEM

(71) Applicant: Dell Products L.P., Round Rock, TX (US)

(72) Inventors: Smruti Ranjan Debata, Bangalore (IN); Ravishankar N. Kanakapura, Bangalore (IN); Yogesh Prabhakar Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 316 days.

(21) Appl. No.: 16/857,950

(22) Filed: Apr. 24, 2020

(65) Prior Publication Data
US 2021/0336772 A1 Oct. 28, 2021

(51) Int. Cl.
| | |
|---|---|
| H04L 9/08 | (2006.01) |
| H04L 9/30 | (2006.01) |
| G06F 9/455 | (2018.01) |
| G06F 12/06 | (2006.01) |
| G06F 21/60 | (2013.01) |

(52) U.S. Cl.
CPC ........ *H04L 9/0825* (2013.01); *G06F 9/45558* (2013.01); *G06F 12/06* (2013.01); *G06F 21/602* (2013.01); *H04L 9/30* (2013.01); *G06F 2009/45583* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 2003/0065933 | A1* | 4/2003 | Hashimoto | G06F 21/123 713/194 |
| 2008/0232599 | A1* | 9/2008 | Terui | H04L 63/04 380/283 |
| 2008/0298297 | A1* | 12/2008 | Orakkan | G07C 9/27 370/316 |
| 2015/0277949 | A1* | 10/2015 | Loh | G06F 9/45558 718/1 |
| 2018/0314827 | A1* | 11/2018 | Wells | G06F 9/45558 |
| 2019/0095651 | A1* | 3/2019 | Yokoi | G06F 3/0661 |
| 2019/0173858 | A1* | 6/2019 | Shin | H04L 63/08 |

(Continued)

*Primary Examiner* — Bassam A Noaman
(74) *Attorney, Agent, or Firm* — McDermott Will & Emery LLP

(57) ABSTRACT

A Computing environment is described to enable an information handling system (IHS) to receive a public encryption key from another IHS; and decrypt with a public encryption key one or more encrypted symmetric encryption keys, encrypted via a private encryption key, to obtain one or more symmetric encryption keys respectively associated with one or more memory address ranges. The IHS may physically receive a memory device that was utilized by the other IHS to store information in an encrypted fashion. The IHS may further decrypt, with a first encryption key of the one or more symmetric encryption keys associated with a first address range of the one or more address ranges, first encrypted data stored by the at least one non-volatile memory medium to obtain first data.

20 Claims, 7 Drawing Sheets

(56) References Cited

U.S. PATENT DOCUMENTS

| | | | |
|---|---|---|---|
| 2020/0201786 A1* | 6/2020 | Ouziel | G06F 11/0745 |
| 2020/0202012 A1* | 6/2020 | Shanbhogue | H04L 9/0866 |
| 2021/0200879 A1* | 7/2021 | Gerzon | H04L 9/0631 |
| 2021/0263779 A1* | 8/2021 | Haghighat | G06F 9/5061 |

* cited by examiner

SYSTEM AND METHOD OF MIGRATING ONE OR MORE STORAGE CLASS MEMORIES FROM A FIRST INFORMATION HANDLING SYSTEM TO A SECOND INFORMATION HANDLING SYSTEM

BACKGROUND

Field of the Disclosure

This disclosure relates generally to information handling systems and more particularly to migrating one or more storage class memories from a first information handling system to a second information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive, by a first information handling system, a public encryption key from a second information handling system, different from the first information handling system; may receive, by the first information handling system and from the second information handling system, one or more memory address ranges of a memory device and respectively associated one or more encrypted symmetric encryption keys, wherein the one or more encrypted symmetric encryption keys were encrypted via an asymmetric cryptographic process with a private encryption key associated with the public encryption key; may decrypt, by the first information handling system, the one or more encrypted symmetric encryption keys, via the asymmetric cryptographic process, to obtain one or more symmetric encryption keys respectively associated with the one or more memory address ranges, wherein the asymmetric cryptographic process utilizes the public encryption key to decrypt the one or more encrypted symmetric encryption keys to obtain the one or more symmetric encryption keys; may physically receive, by the first information handling system, the memory device, which includes at least one volatile memory medium and at least one non-volatile memory medium, that was utilized by the second information handling system to store information in an encrypted fashion; may decrypt, by the first information handling system, with a first encryption key of the one or more symmetric encryption keys associated with a first address range of the one or more address ranges, first encrypted data stored by the at least one non-volatile memory medium to obtain first data; and may decrypt, by the first information handling system, with a second encryption key of the one or more symmetric encryption keys associated with a second address range of the one or more address ranges, second encrypted data stored by the at least one non-volatile memory medium to obtain second data.

In one or more embodiments, the first address range of the memory device may be associated with a first virtual machine. In one or more embodiments, the second address range of the memory device may be associated with a second virtual machine, different from the first virtual machine. In one or more embodiments, the memory device may include a non-volatile dual-inline memory module that includes the at least one non-volatile memory medium and the at least one non-volatile memory medium. In one or more embodiments, the at least one non-volatile memory medium may include flash memory. In one or more embodiments, receiving, by the first information handling system, the public encryption key from the second information handling system may include receiving, by a baseboard management controller of the first information handling system, the public encryption key from the second information handling system via a data link layer of an Open Systems Interconnection (OSI) model.

In one or more embodiments, decrypting with the first encryption key of the one or more symmetric encryption keys associated with the first address range of the one or more address ranges, by the first information handling system, the first encrypted data stored by the at least one non-volatile memory medium to obtain the first data may include an operating system executed by the first information handling system decrypting with the first encryption key of the one or more symmetric encryption keys associated with the first address range of the one or more address ranges, by the first information handling system, the first encrypted data stored by the at least one non-volatile memory medium to obtain the first data.

In one or more embodiments, decrypting with the first encryption key of the one or more symmetric encryption keys associated with the first address range of the one or more address ranges, by the first information handling system, the first encrypted data stored by the at least one non-volatile memory medium to obtain the first data may include a virtual machine executed by the first information handling system decrypting with the first encryption key of the one or more symmetric encryption keys associated with the first address range of the one or more address ranges, by the first information handling system, the first encrypted data stored by the at least one non-volatile memory medium to obtain the first data.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
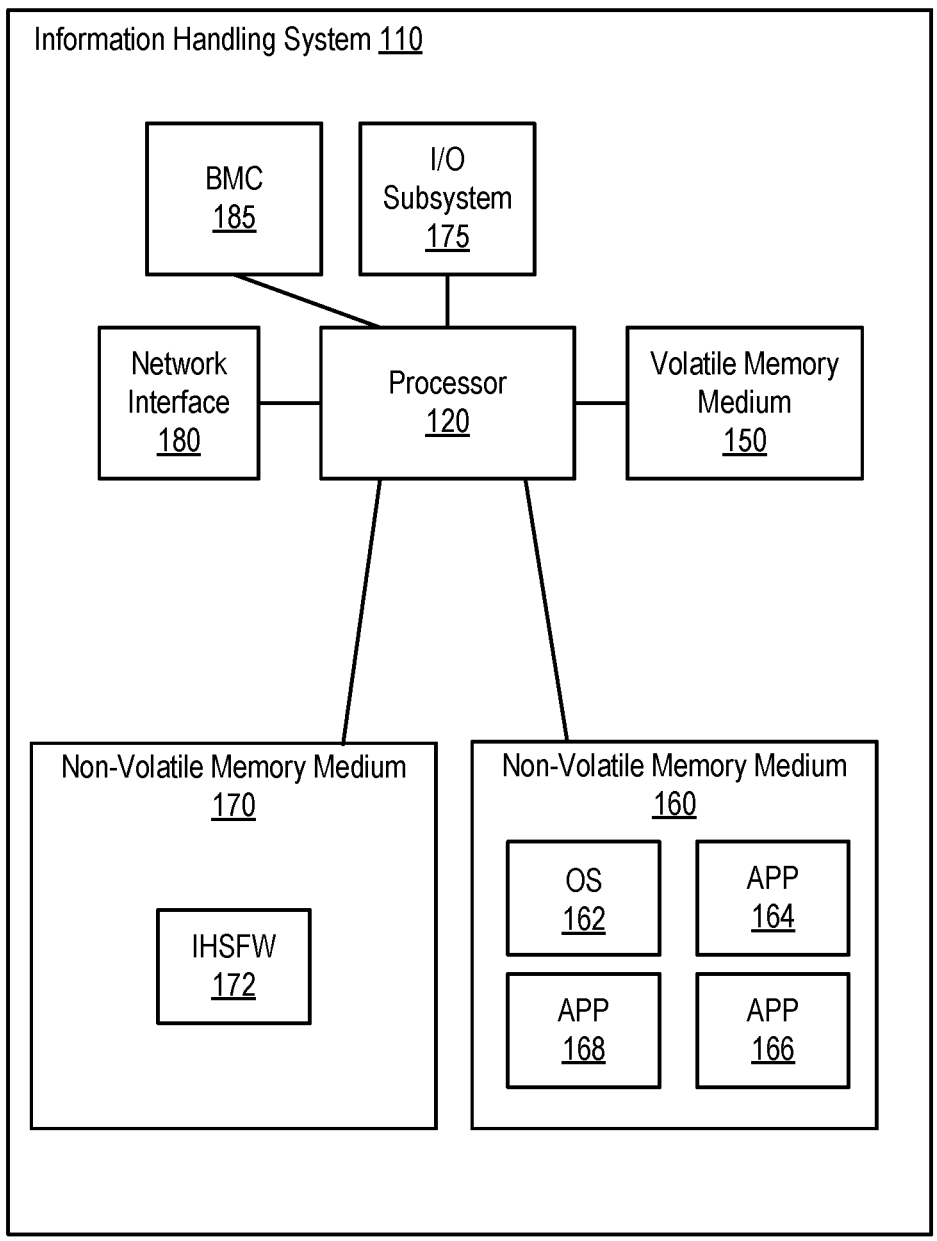
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, data may be stored via a storage class memory (SCM). For example, the SCM may include one or more volatile memory media and one or more non-volatile memory media. In one or more embodiments, the data may be stored as encrypted data via the SCM. For example, the data may be encrypted before storing it to the SCM. In one or more embodiments, the SCM may be migrated from a first information handling system to a second information handling system, different from the first information handling system. In one example, if the first information handling system includes a trusted platform module (TPM), a process may be utilized to decrypt data stored via the SCM after the SCM is moved or migrated to the second information handling system. In a second example, one or more secure processor (SP) generated keys in a TPM may be volatile. For instance, the one or more SP generated keys may change after a power cycle, which may not be available outside a root of trust chain. In a third example, a process may be utilized to physically migrate the SCM across a TPM based first information handling system cluster to a second information handling system cluster. In another example, a backup process may be utilized before a migration process of the SCM, and a restore process may be utilized after the migration process of the one or more SCM modules.

In one or more embodiments, one or more systems, one or more processes and/or one or more methods may decrypt data stored via SCM modules across multiple information handling systems by establishing verification between or among two or more baseboard management controllers (BMCs) of respective information handling systems. In one or more embodiments, one or more systems, one or more processes and/or one or more methods may decrypt data stored via SCM modules across multiple information handling systems by establishing verification between a baseboard management controller (BMC) of an information handling system and a cluster manager.

In one or more embodiments, a TPM trust chain may include a BMC of an information handling system. For example, the TPM trust chain may originate from a SP. In one or more embodiments, the BMC may access one or more encryption keys of an operating system (OS) and/or a hypervisor (HV). In one or more embodiments, a source BMC of a first information handling system may include an application programming interface (API) that may accept one or more destination BMCs (of other one or more information handling systems) and/or one or more cluster manager addresses (e.g., media access control addresses) before a SCM migration process is initiated. In one or more embodiments, a source BMC may initiate a handshake with a destination BMC or a cluster manager via a media access control (MAC) address. For example, the handshake may utilize a protocol. In one instance, the protocol may include a link layer discovery protocol (LLDP). In another instance, the protocol may include a data center bridging capability exchange (DCBX) protocol. In one or more embodiments, the protocol may be utilized to inform one or more other BMCs of one or more SCM component migrations. For example, the one or more other BMCs may determine that the source BMC is trustworthy after receiving information associated with the one or more SCM component migrations. For instance, the one or more other BMCs may determine that the source BMC is trustworthy in further communications during the one or more SCM component migrations.

In one or more embodiments, a SCM component may be installed into the first information handling system. For example, a destination BMC of the second information handling system may validate with the source BMC of the first information handling system to confirm a migration of the SCM component. For instance, the destination BMC may validate one or more of a hardware identification and component identification information, among others, with the source BMC.

In one or more embodiments, if the source BMC receives a successful acknowledgement from the destination BMC, the source BMC may extend its root of trust chain. For example, the source BMC extending its root of trust chain may include providing an encryption key. For instance, the encryption key may include a trust encryption key of the source BMC. In one or more embodiments, the destination BMC may communicate with the source BMC via the encryption key provided by the source BMC. For example, the destination BMC may receive one or more platform encryption keys from the source BMC via the encryption key provided by the source BMC. For instance, the destination BMC may utilize the one or more platform encryption keys in decrypting encrypted data stored via SCM component.

In one or more embodiments, the source BMC may be included in a SP trust chain. In one or more embodiments, one or more runtime encryption keys may be retrieved. In one example, the one or more runtime encryption keys may be retrieved from an OS executing on the first information handling system. In another example, the one or more runtime encryption keys may be retrieved from a HV executing on the first information handling system. In one or more embodiments, the one or more runtime encryption keys may be utilized to decrypt encrypted data stored by a SCM module of the first information handling system. In one or more embodiments, an address of a destination BMC or an address of a destination cluster manager may be obtained. In one example, communications may be established between the source BMC and the destination BMC utilizing the address of the destination BMC. For instance, the address of the destination BMC may include a MAC address of the destination BMC. In another example, communications may be established between the source BMC and the cluster manager utilizing the address of the cluster manager. For instance, the address of the cluster manager may include a MAC address of the cluster manager.

In one or more embodiments, communications between the source BMC and the destination BMC may include utilizing a LLDP. In one or more embodiments, communications between the source BMC and the cluster manager may include utilizing a LLDP. In one or more embodiments, communications between the source BMC and the destination BMC may include utilizing a DCBX protocol. In one or more embodiments, communications between the source BMC and the cluster manager may include utilizing a DCBX protocol.

In one or more embodiments, the destination BMC may validate one or more of a hardware identification and component identification information, among others, with the source BMC. In one or more embodiments, the destination BMC may receive the one or more runtime encryption keys from the source BMC. In one or more embodiments, the cluster manager may receive the one or more runtime encryption keys from the source BMC. In one or more embodiments, the SCM module may be transferred from the first information handling system to the second information handling system. In one or more embodiments, the second information handling system may utilize the one or more runtime encryption keys to decrypt the encrypted data stored by the SCM module.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a BMC 185. As illustrated, volatile memory medium 150, non-volatile memory media 160 and 170, I/O subsystem 175, network interface 180, and BMC 185 may be communicatively coupled to processor 120.

In one or more embodiments, one or more of volatile memory medium 150, non-volatile memory media 160 and 170, I/O subsystem 175, network interface 180, and BMC 185, among others, may be communicatively coupled to processor 120 via one or more buses, one or more switches, and/or one or more root complexes, among others. In one example, one or more of volatile memory medium 150, non-volatile memory media 160 and 170, I/O subsystem 175, network interface 180, and BMC 185, among others, may be communicatively coupled to processor 120 via one or more PCI-Express (PCIe) root complexes. In another example, one or more of I/O subsystem 175, network interface 180, and BMC 185, among others, may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 185 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 185 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be or include an application processor. In one example, BMC 185 may be or include an ARM Cortex-A processor. In another example, BMC 185 may be or include an Intel Atom processor. In one or more embodiments, BMC 185 may be or include one or more of a field programmable gate array (FPGA) and an ASIC, among others, configured, coded, and/or encoded with instructions in accordance with at least a portion of one or more of systems, one or more flowcharts, one or more methods, and/or one or more processes described herein.

Figure 1B:
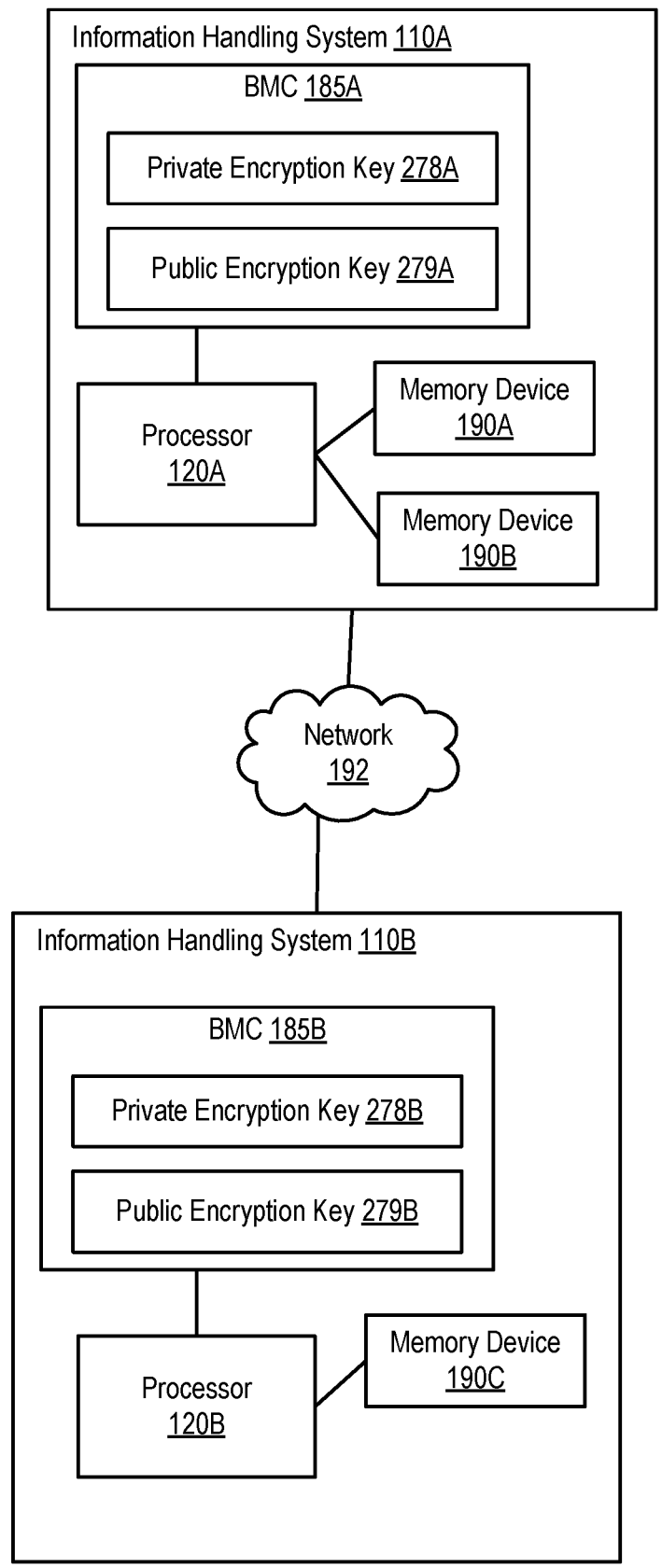
FIG. 1B illustrates an example of information handling systems coupled to a network, according to one or more embodiments.

Turning now to FIG. 1B, an example of information handling systems coupled to a network is illustrated, according to one or more embodiments. At shown, an IHS 110A may be coupled to a network 192. As illustrated, an IHS 110B may be coupled to network 192. In one or more embodiments, network 192 may include a local area network. As shown, IHS 110A may include a processor 120A, a BMC 185A, and memory devices 190A and 190B. As illustrated, BMC 185A and memory devices 190A and 190B may be coupled to processor 120A. In one or more embodiments, a memory device 190 may include at least one volatile memory medium and at least one non-volatile memory medium. For example, a memory device 190 may include one or more non-volatile dual-inline memory modules. For instance, a non-volatile dual-inline memory module may include one or more non-volatile memory media and may include one or more one or more volatile memory media. In one or more embodiments, one or more non-volatile memory media of memory device 190 may include flash memory.

As shown, BMC 185 may include a private encryption key 278A and a public encryption key 279A. In one or more embodiments, a public encryption key 279 may be derived from a private encryption key 278. As illustrated, IHS 110B may include a processor 120B, a BMC 185B, and a memory device 190C. As shown, BMC 185B and memory device 190C may be coupled to processor 120B. As illustrated, BMC 185 may include a private encryption key 278B and a public encryption key 279B.

Figure 1C:
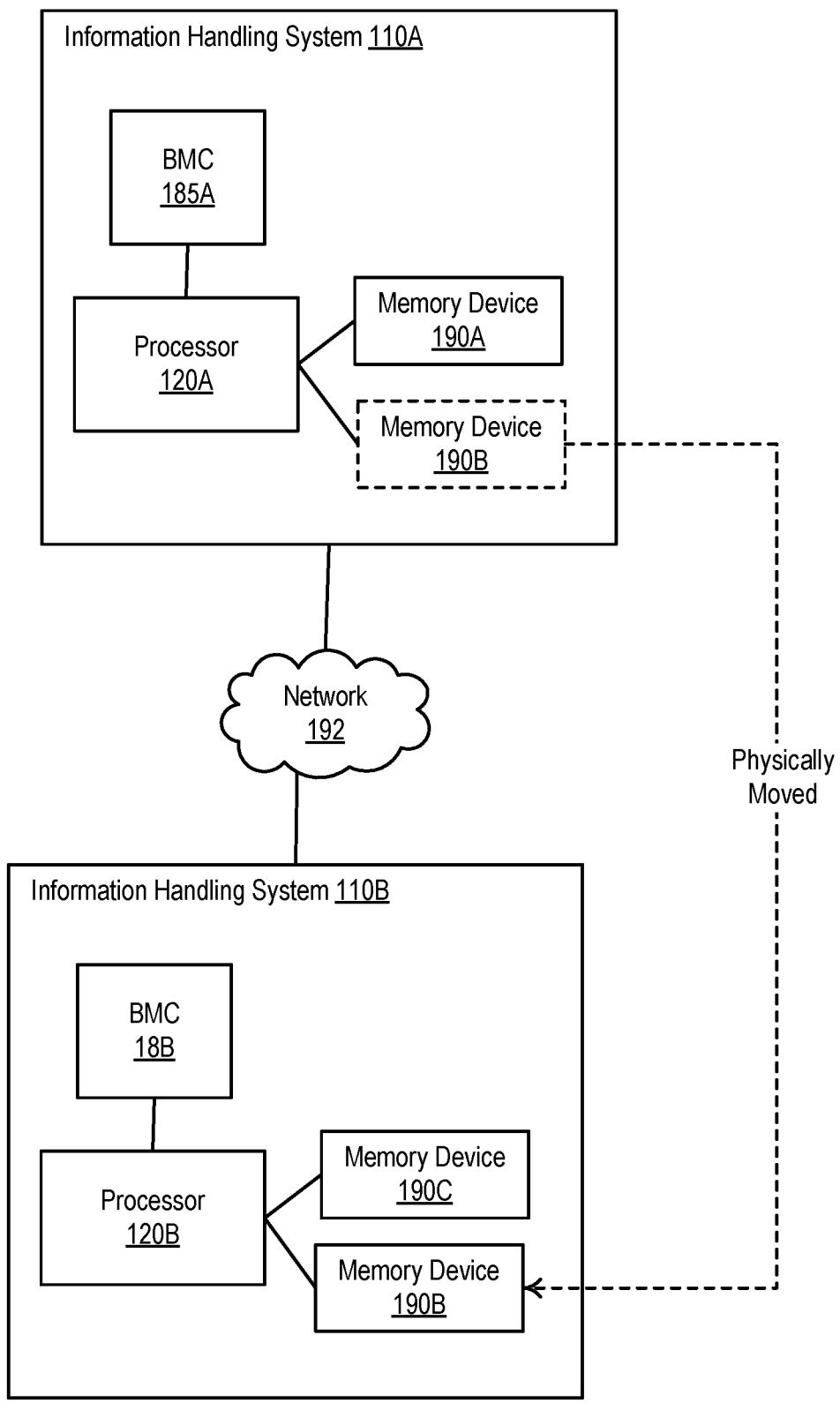
FIG. 1C illustrates an example physically moving a memory device from one information handling system to another information handling system.

Turning now to FIG. 1C, an example of physically moving a memory device from one information handling system to another information handling system is illustrated, according to one or more embodiments. As shown, memory device 190B may be physically moved from IHS 110A to IHS 110B. In one or more embodiments, memory device 190B may be physically moved from IHS 110A to IHS 110B while IHS 110A is executing instructions. For example, memory device 190B may be hot-removed from IHS 110A. In one or more embodiments, memory device 190B may be physically moved from IHS 110A to IHS 110B while IHS 110B is executing instructions. For example, memory device 190B may be hot-plugged into IHS 110B. In one or more embodiments, one or more non-volatile memory media of memory device 190B may store data of memory device 190B while memory device 190B is physically moved from IHS 110A to IHS 110B.

In one or more embodiments, IHS 110A may store encrypted data via the at least one volatile memory medium of memory device 190B. For example, memory device 190B may receive a signal. For instance, the signal may indicate that the encrypted data, stored via the at least one volatile memory medium of memory device 190B, is to be stored via the at least one non-volatile memory medium of memory device 190B. In one or more embodiments, memory device 190B may store the encrypted data, stored via the at least one volatile memory medium of memory device 190B, which may be stored via the at least one non-volatile memory medium of memory device 190B. For example, storing the encrypted data, stored via the at least one volatile memory medium of memory device 190B, which may be stored via the at least one non-volatile memory medium of memory device 190B may be performed in response to receiving the signal. In one or more embodiments, processor 120A may provide the signal to memory device 190B. In one or more embodiments, BMC 185A may provide the signal to memory device 190B. In one or more embodiments, the signal may be provided to memory device 190B before memory device 190B may be hot-removed from IHS 110A.

In one or more embodiments, physically moving memory device 190B from IHS 110A to IHS 110B may include physically removing memory device 190B from IHS 110A. In one or more embodiments, physically moving memory device 190B from IHS 110A to IHS 110B may include physically combining memory device 190B with IHS 110B. For example, physically moving memory device 190B from IHS 110A to IHS 110B may include physically inserting memory device 190B into IHS 110B.

In one or more embodiments, an OS may utilize memory device 190B. For example, the OS may be moved from IHS 110A to IHS 110B. For instance, the OS may continue to utilize memory device 190B after memory device 190B has been physically moved from IHS 110A to IHS 110B. In one or more embodiments, a virtual machine (VM) may utilize memory device 190B. For example, the VM may be moved from IHS 110A to IHS 110B. For instance, the VM may continue to utilize memory device 190B after memory device 190B has been physically moved from IHS 110A to IHS 110B.

Figure 2:
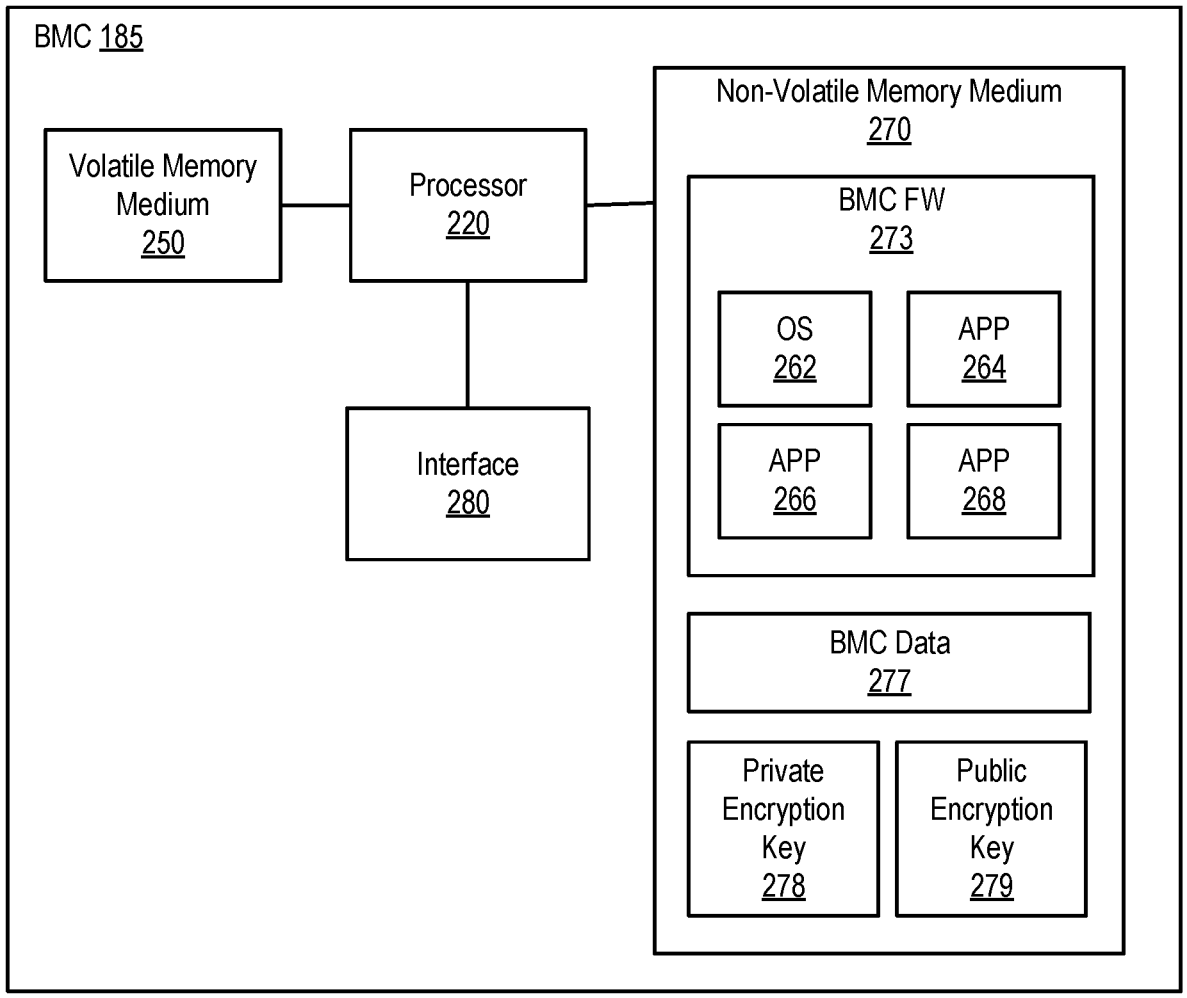
FIG. 2 illustrates an example of a baseboard management controller, according to one or more embodiments.

Turning now to FIG. 2, an example of a baseboard management controller is illustrated, according to one or more embodiments. As shown, BMC 185 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). In a second example, OS 262 may be or include an Unix-like operating system. For instance, the Unix-like operating system may be or include Linux, FreeBSD, NetBSD, OpenBSD, Minix, Xinu, or Darwin, among others. In another example, OS 262 may be or include a portable operating system interface (POSIX) compliant operating system. As illustrated, non-volatile memory medium 270 may include a private encryption key 278. As shown, non-volatile memory medium 270 may include a public encryption key 279. In one or more embodiments, private encryption key 278 and public encryption key 279 may be asymmetric encryption keys. In one example, data encrypted via private encryption key 278 may be decrypted via public encryption key 279. For instance, data encrypted via private encryption key 278 may be decrypted, utilizing an asymmetric cryptographic process, via public encryption key 279. In another example, data encrypted via public encryption key 279 may be decrypted via private encryption key 278. For instance, data encrypted via public encryption key 279 may be decrypted, utilizing the asymmetric cryptographic process, via private encryption key 278.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 185 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, at least a portion of one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3A:
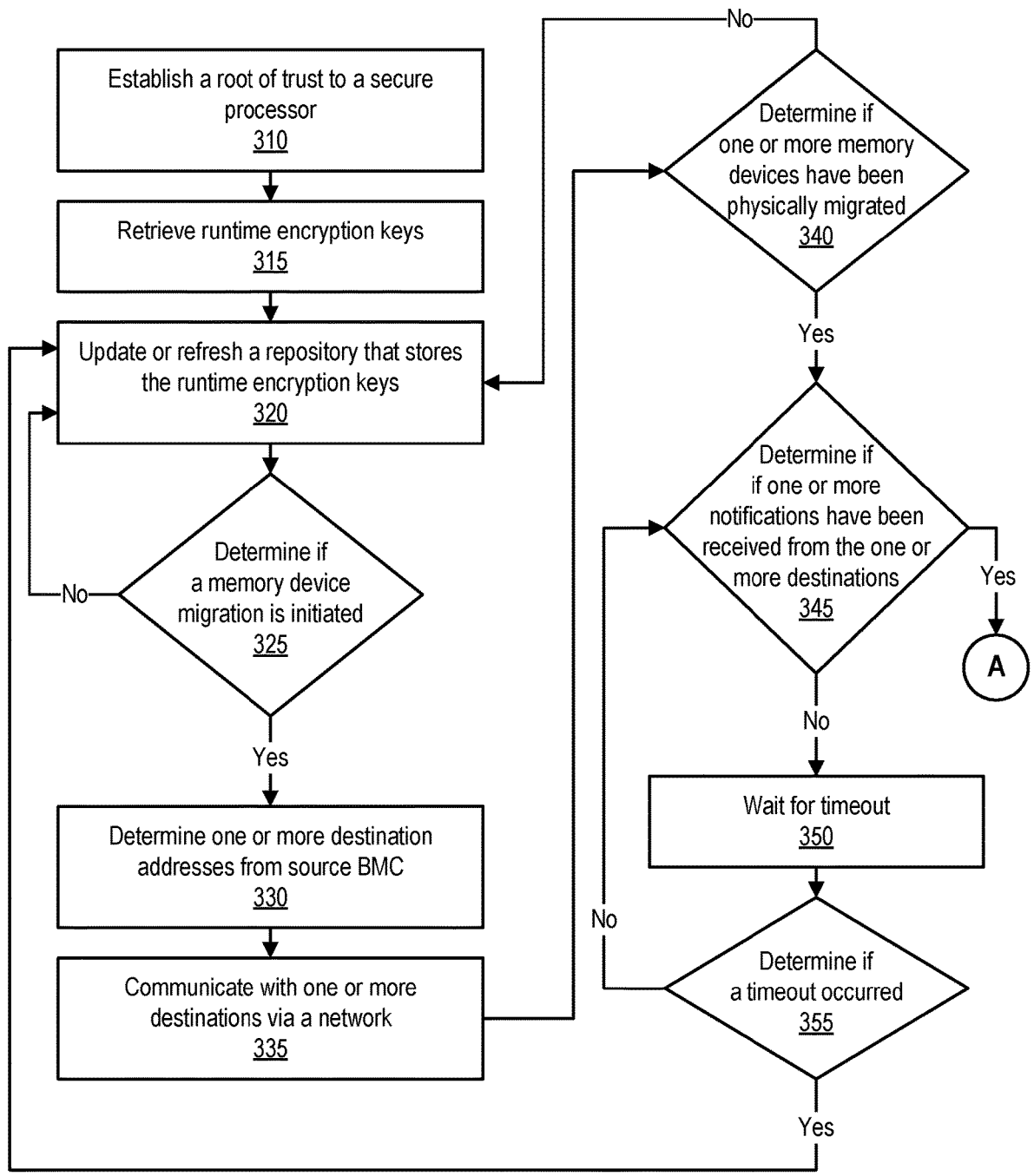
FIGS. 3A and 3B illustrate an example of a method of migrating a memory device, according to one or more embodiments.
Figure 3B:
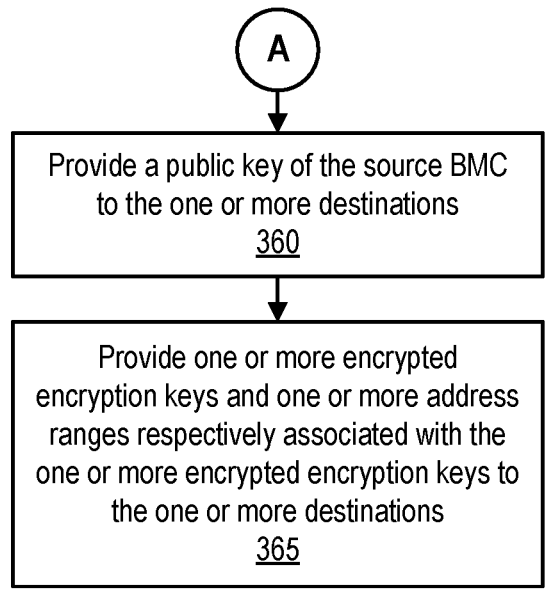

Turning now to FIGS. 3A and 3B, an example of a method of migrating a memory device is illustrated, according to one or more embodiments. At 310, a root of trust may be established with a secure processor. For example, a secure processor may include a TPM. In one or more embodiments, establishing the root of trust may include including a source BMC in a root of trust chain. For example, BMC 185A may be included in a root of trust chain associated with IHS 110A.

Figure 4:
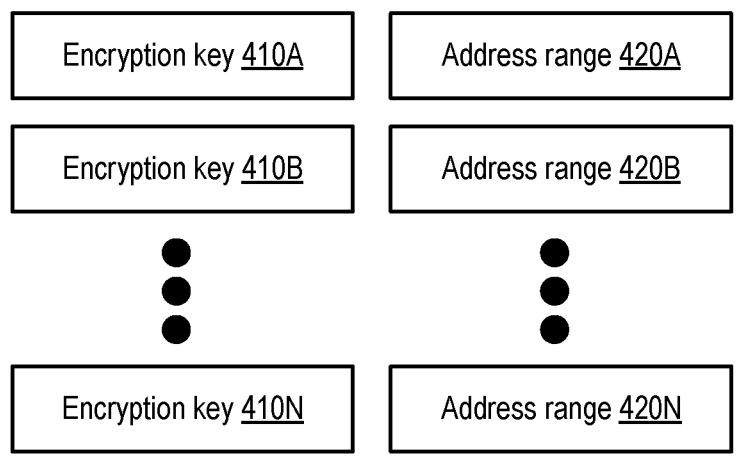
FIG. 4 illustrates an example of encryption keys and respectively associated memory address ranges, according to one or more embodiments.

At 315, one or more runtime encryption keys may be retrieved. For example, a runtime encryption key may include a symmetric encryption key utilized to encrypt and decrypt data of an address range of a memory device 190. In one or more embodiments, encryption keys 410A-410N may be respectively associated with address ranges 420A-420N of a memory device 190, as illustrated in FIG. 4. In one example, address range 420A may be associated with a first OS. For instance, the first OS may utilize encryption key 410A to encrypt and decrypt data of address range 420A. In a second example, address range 420B may be associated with a second OS, different from the first OS. For instance, the second OS may utilize encryption key 410B to encrypt and decrypt data of address range 420B. In a third example, address range 420A may be associated with a first VM. For instance, the first VM may utilize encryption key 410A to encrypt and decrypt data of address range 420A. In another example, address range 420B may be associated with a second VM, different from the first VM. For instance, the second VM may utilize encryption key 410B to encrypt and decrypt data of address range 420B.

In one or more embodiments, an encryption key 410 may be a symmetric encryption key. For example, an encryption key 410 may be utilized with a symmetric cryptographic process. In one or more embodiments, the source BMC may store encryption keys 410A-410N respectively associated with address ranges 420A-420N. For example, BMC 185A may store encryption keys 410A-410N respectively associated with address ranges 420A-420N. In one or more embodiments, the source BMC may store information associated with address ranges 420A-420N. For example, BMC 185A may store information associated with address ranges 420A-420N. In one or more embodiments, a runtime encryption key may be retrieved from a hypervisor. In one or more embodiments, a runtime encryption key may be retrieved from an OS. In one or more embodiments, a runtime encryption key may include a symmetric encryption key. In one or more embodiments, a runtime encryption key may include a key identification (ID). In one or more embodiments, BMC 185A may retrieve the one or more runtime encryption keys.

At 320, a repository that stores the runtime encryption keys may be updated or refreshed. In one example, a new symmetric encryption key utilized to encrypt and decrypt data of an address range of a memory device 190 may be added to the repository. For instance, the repository may be updated or refreshed with the new symmetric encryption key and/or the address range associated with the new symmetric encryption key. In another example, a symmetric encryption key utilized to encrypt and decrypt data of an address range of a memory device 190 may be removed from the repository. In one or more embodiments, the repository that stores the runtime encryption keys may be updated or refreshed via an application of the source BMC. For example, the repository that stores the runtime encryption keys may be updated or refreshed via a background application of BMC 185A. For instance, the background application of BMC 185A may include a daemon. In one or more embodiments, BMC 185A may store the repository. In one or more embodiments, a TPM may generate the runtime encryption keys.

At 325, it may be determined if a memory device migration is initiated. If the memory device migration is not initiated, the method may proceed to 320, according to one or more embodiments. If the memory device migration is initiated, one or more destination addresses may be determined from a source BMC, at 330. For example, the source BMC may be BMC 185A. For instance, one or more destination addresses may be determined from BMC 185A. In one or more embodiments, the one or more destination addresses may include one or more network addresses. For example, the one or more destination addresses may include one or more MAC addresses. In one or more embodiments, the source BMC may receive the one or more destination addresses from user input.

At 335, the source BMC may communicate with one or more destinations via a network. In one example, a destination may include a cluster manager. In another example, a destination may include a BMC. For instance, a destination may include BMC 185B. As an example, BMC 185A may communicate with BMC 185B via network 192. In one or more embodiments, one or more communications may occur via a LLDP. In one or more embodiments, one or more communications may occur via a DCBX protocol. In one or more embodiments, one or more communications may occur via a simple network management protocol (SNMP). In one or more embodiments, a communication with a destination may include information that may indicate that a migration of a memory device 190 is forthcoming.

At 340, it may be determined if one or more memory devices have been physically migrated. If one or more memory devices have not been physically migrated, the method may proceed to 320, according to one or more embodiments. If one or more memory devices have been physically migrated, it may be determined if one or more notifications have been received from the one or more destinations, at 345. For example, the one or more notifications may indicate that the one or more destinations are ready to proceed with one or more migrations of one or more memory devices. If the one or more notifications have not been received from the one or more destinations, the source BMC may wait for a timeout, at 350.

At 355, it may be determined if the timeout has occurred. If the timeout has not occurred, the method may proceed to 345, according to one or more embodiments. If the timeout has occurred, the method may proceed to 320, according to one or more embodiments. If the one or more notifications have been received from the one or more destinations, the source BMC may provide a public key of the source BMC to the one or more destinations, at 360. For example, BMC 185A may provide public key 179A to BMC 185B. For instance, BMC 185A may provide public key 179A to BMC 185B via network 192.

At 365, the source BMC may provide one or more encrypted encryption keys and one or more address ranges respectively associated with the one or more encrypted encryption keys to the one or more destinations. For example, BMC 185A may provide one or more encrypted encryption keys and one or more address ranges respectively associated with the one or more encrypted encryption keys to the one or more destinations. In one or more embodiments, the one or more encrypted encryption keys may be encrypted via a private key encryption key associated with the public encryption key. For example, the one or more encrypted encryption keys may be encrypted via private key encryption key 178A. For instance, BMC 185A may encrypt one or more of encryption keys 410A-410N via private key encryption key 178A.

Figure 5:
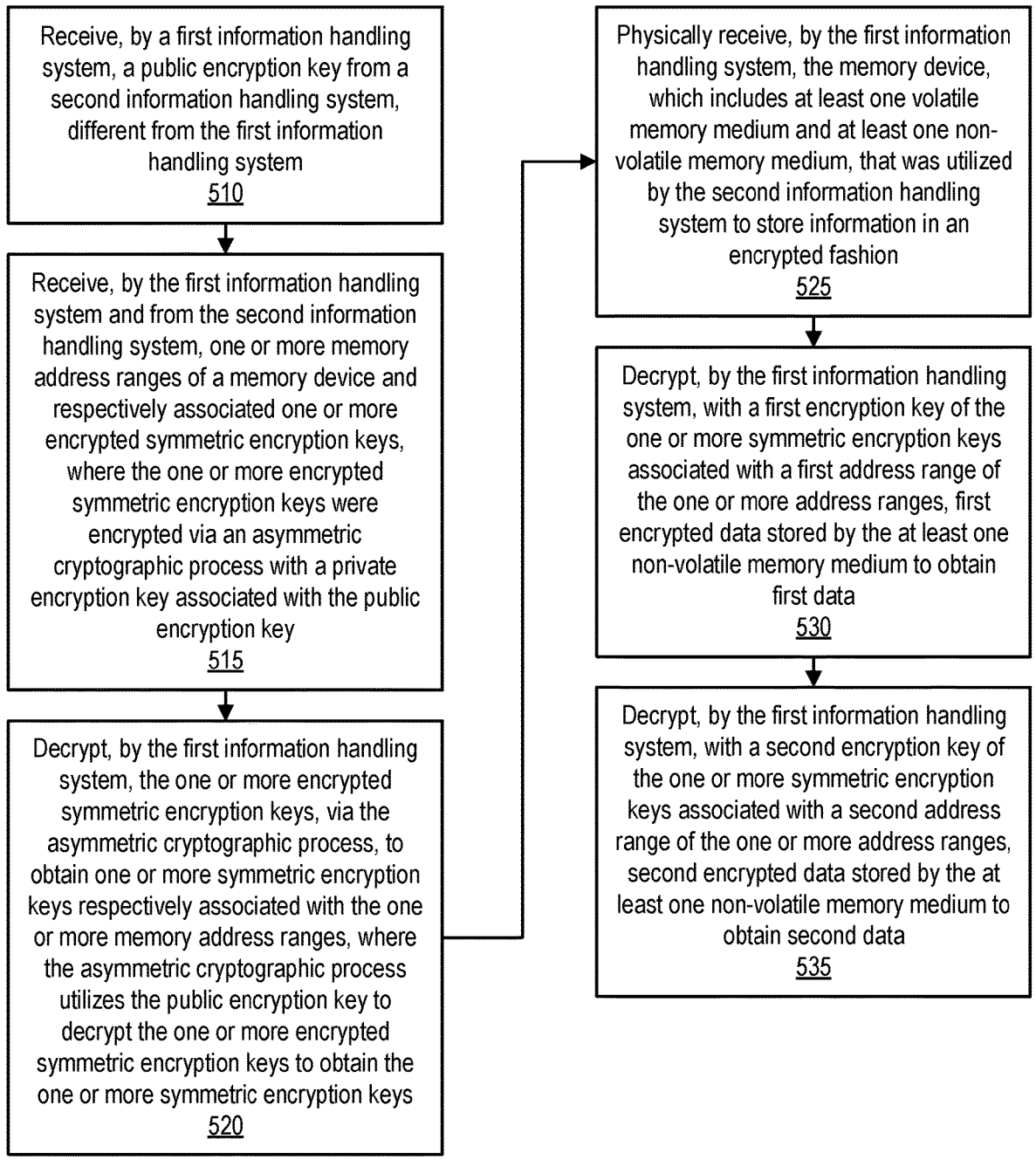
FIG. 5 illustrates another example of a method of migrating a memory device is illustrated, according to one or more embodiments.

Turning now to FIG. 5, another example of a method of migrating a memory device is illustrated, according to one or more embodiments. At 510, a public encryption key may be received by a first information handling system from a second information handling system, different from the first information handling system. For example, IHS 110B may receive a public encryption key from IHS 110A. For instance, IHS 110B may receive public encryption key 279A from IHS 110A. In one or more embodiments, the first information handling system receiving the public encryption key from the second information handling system may include the first information handling system receiving the public encryption key from the second information handling system via a network. In one example, the first information handling system receiving the public encryption key from the second information handling system may include the first information handling system receiving the public encryption key from the second information handling system via a data link layer of an Open Systems Interconnection (OSI) model. In another example, the first information handling system receiving the public encryption key from the second information handling system may include the first information handling system receiving the public encryption key from the second information handling system via a LLDP, a DCBX protocol, or a SNMP, among others.

In one or more embodiments, the first information handling system receiving the public encryption key from the second information handling system may include a BMC of the first information handling system receiving the public encryption key from a BMC of the second information handling system. For example, BMC 185B may receive public encryption key 279A from BMC 185A. For instance, BMC 185B may receive public encryption key 279A from BMC 185A via network 192. In one or more embodiments, BMC 185B may receive public encryption key 279A from BMC 185A via a data link layer of an OSI model. In one or more embodiments, BMC 185B may receive public encryption key 279A from BMC 185A via a LLDP, a DCBX protocol, or a SNMP, among others.

At 515, one or more memory address ranges of a memory device and one or more encrypted symmetric encryption keys, encrypted via an asymmetric cryptographic process with a private encryption key associated with the public encryption key, respectively associated with the one or more memory addresses ranges may be received by the first information handling system from the second information handling system. For example, one or more of address ranges 420A-420N of a memory device 190 and one or more of encryption keys 410A-410N, encrypted via an asymmetric cryptographic process with private encryption key 278A, may be received by IHS 110B from IHS 110A. For instance, one or more of address ranges 420A-420N of a memory device 190 and one or more of encryption keys 410A-410N, encrypted via an asymmetric cryptographic process with private encryption key 278A, may be received by BMC 185B from BMC 185A.

In one or more embodiments, the one or more memory address ranges of the memory device and the one or more encrypted symmetric encryption keys, encrypted via the asymmetric cryptographic process with the private encryption key associated with the public encryption key, respectively associated with the one or more memory addresses ranges may be received by the first information handling system from the second information handling system via a network. In one example, the one or more memory address ranges of the memory device and the one or more encrypted symmetric encryption keys, encrypted via the asymmetric cryptographic process with the private encryption key associated with the public encryption key, respectively associated with the one or more memory addresses ranges may be received by the first information handling system from the second information handling system via a data link layer of an OSI model. In another example, the one or more memory address ranges of the memory device and the one or more encrypted symmetric encryption keys, encrypted via the asymmetric cryptographic process with the private encryption key associated with the public encryption key, respectively associated with the one or more memory addresses ranges may be received by the first information handling system from the second information handling system via a LLDP, a DCBX protocol, or a SNMP, among others.

In one or more embodiments, one or more of address ranges 420A-420N of a memory device 190 and one or more of encryption keys 410A-410N, encrypted via an asymmetric cryptographic process with private encryption key 278A, may be received by BMC 185B from BMC 185A via network 192. In one example, one or more of address ranges 420A-420N of a memory device 190 and one or more of encryption keys 410A-410N, encrypted via an asymmetric cryptographic process with private encryption key 278A, may be received by BMC 185B from BMC 185A via a data link layer of an OSI model. In another example, one or more of address ranges 420A-420N of a memory device 190 and one or more of encryption keys 410A-410N, encrypted via an asymmetric cryptographic process with private encryption key 278A, may be received by BMC 185B from BMC 185A via a LLDP, a DCBX protocol, or a SNMP, among others.

At 520, the first information handling system may decrypt the one or more encrypted symmetric encryption keys, via the asymmetric cryptographic process with the public encryption key, to obtain one or more symmetric encryption keys respectively associated with the one or more memory address ranges. For example, IHS 110B may decrypt the one or more encrypted symmetric encryption keys, via the asymmetric cryptographic process with the public encryption key, to obtain one or more of encryption keys 410A-410N. For instance, BMC 185B may decrypt the one or more encrypted symmetric encryption keys, via the asymmetric cryptographic process with the public encryption key, to obtain one or more of encryption keys 410A-410N.

At 525, the first information handling system may physically receive the memory device, which may include at least one volatile memory medium and at least one non-volatile memory medium, that was utilized by the second information handling system to store information in an encrypted fashion. For example, IHS 110B may physically receive memory device 190B, which may include at least one volatile memory medium and at least one non-volatile memory medium, that was utilized by IHS 110A to store information in an encrypted fashion.

At 530, the first information handling system may decrypt with a first encryption key of the one or more symmetric encryption keys associated with a first address range of the one or more address ranges first encrypted data stored by the at least one non-volatile memory medium to obtain first data. For example, IHS 110B may decrypt, with a first encryption key of one or more of encryption keys 410A-410N associated with a first address range of one or more address ranges 420A-420N, first encrypted data stored by the at least one non-volatile memory medium to obtain first data. In one instance, a first OS executing on IHS 110B may decrypt, with a first encryption key of one or more of encryption keys 410A-410N associated with a first address range of one or more address ranges 420A-420N, first encrypted data stored by the at least one non-volatile memory medium to obtain first data. In another instance, a first VM executing on IHS 110B may decrypt, with a first encryption key of one or more of encryption keys 410A-410N associated with a first address range of one or more address ranges 420A-420N, first encrypted data stored by the at least one non-volatile memory medium to obtain first data. In one or more embodiments, the first data may be utilized by an application. In one or more embodiments, the first data may include an application.

At 535, the first information handling system may decrypt with a second encryption key of the one or more symmetric encryption keys associated with a second address range of the one or more address ranges second encrypted data stored by the at least one non-volatile memory medium to obtain second data. For example, IHS 110B may decrypt, with a second encryption key of one or more of encryption keys 410A-410N associated with a second address range of one or more address ranges 420A-420N, second encrypted data stored by the at least one non-volatile memory medium to obtain second data. In one instance, a second OS, different from the first OS, executing on IHS 110B may decrypt, with a second encryption key of one or more of encryption keys 410A-410N associated with a second address range of one or more address ranges 420A-420N, second encrypted data stored by the at least one non-volatile memory medium to obtain first data. In a second instance, a second VM, different from the first VM, executing on IHS 110B may decrypt, with a second encryption key of one or more of encryption keys 410A-410N associated with a second address range of one or more address ranges 420A-420N, second encrypted data stored by the at least one non-volatile memory medium to obtain second data. In a third instance, the first OS executing on IHS 110B may decrypt, with a second encryption key of one or more of encryption keys 410A-410N associated with a second address range of one or more address ranges 420A-420N, second encrypted data stored by the at least one non-volatile memory medium to obtain second data. In another instance, the first VM executing on IHS 110B may decrypt, with a second encryption key of one or more of encryption keys 410A-410N associated with a second address range of one or more address ranges 420A-420N, second encrypted data stored by the at least one non-volatile memory medium to obtain second data. In one or more embodiments, the second data may be utilized by an application. In one or more embodiments, the second data may include an application.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computing environment, comprising:
a first information handling system, comprising:
at least one first processor; and a first memory, coupled to the at least one first processor, that stores first instructions executable by the at least one first processor;
wherein, when the first instructions are executed by the at least one first processor, the first instructions cause the first information handling system to:
establish a root of trust chain associated with the at least one first processor;
generate one or more encrypted symmetric encryption keys, including encrypting the one or more encrypted symmetric encryption keys via an asymmetric cryptographic process with a private encryption key associated with a public encryption key,
wherein the one or more encrypted symmetric encryption keys are not available outside of the root of trust chain;
receive a notification from a second information handling system indicating that the second information handling system is ready to proceed with a migration of a memory device to the second information handling system from the first information handling system,
wherein the first information handling system waits for the notification for a threshold time after determining that the memory device has been physically migrated from the first information handling system,
the memory device including at least one volatile memory and at least one non-volatile memory,
wherein the memory device is utilized by the first information handling system to store information in an encrypted fashion;
in response to receiving the notification within a time that is less than the threshold time, extend the root of trust chain to the second information handling system, including providing the public encryption key and the one or more encrypted symmetric encryption keys to the second information handling system;
the second information handling system comprising: at least one second processor; and a second memory, coupled to the at least one second processor, that stores second instructions executable by the at least one second processor; wherein, when the second instructions are executed by the at least one second processor, the second instructions cause the second information handling system to:
receive, via a data link layer of an Open Systems Interconnection (OSI) model, the public encryption key and the one or more encrypted symmetric encryption keys from the first information handling system;
receive, via the data link layer of the (OSI) model, from the first information handling system, one or more memory address ranges of the memory device and respectively associated one or more encrypted symmetric encryption keys; and
decrypt, via the asymmetric cryptographic process, the one or more encrypted symmetric encryption keys to obtain one or more symmetric encryption keys respectively associated with the one or more memory address ranges, wherein the asymmetric cryptographic process utilizes the public encryption key to decrypt the one or more encrypted symmetric encryption keys to obtain one or more symmetric encryption keys;
wherein the second information handling system is configured to physically receive the memory device,
wherein the first information handling system continues to update, via an application, one or more symmetric encryption keys and their respective address ranges for other memory devices that have not been physically migrated from the first information handling system; and
wherein the second instructions further cause the second information handling system to:
decrypt, via a symmetric encryption process, first encrypted data stored by the at least one non-volatile memory to obtain first data, wherein the symmetric encryption process utilizes a first encryption key of the one or more symmetric encryption keys associated with a first address range of the one or more address ranges, wherein the first encrypted data is stored via the first address range; and
decrypt, via the symmetric encryption process, second encrypted data stored by the at least one non-volatile memory to obtain second data, wherein the symmetric encryption process utilizes a second encryption key of the one or more symmetric encryption keys associated with a second address range of the one or more address ranges, wherein the second encrypted data is stored via the second address range.

2. The computing environment of claim 1,
wherein the first address range of the memory device is associated with a first virtual machine, and
wherein the second address range of the memory device is associated with a second virtual machine, different from the first virtual machine.

3. The computing environment of claim 1, wherein the memory device includes a non-volatile dual-inline memory module that includes the at least one non-volatile memory and the at least one non-volatile memory.

4. The computing environment of claim 3, wherein the at least one non-volatile memory includes flash memory.

5. The computing environment of claim 1, wherein the second information handling system further comprising: a baseboard management controller configured to receive the public encryption key from the first information handling system via the data link layer of the Open Systems Interconnection (OSI) model, wherein, to receive the one or more encrypted symmetric encryption keys from the first information handling system, the instructions further cause the baseboard management controller to receive the one or more encrypted symmetric encryption keys from the first information handling system via the data link layer of the OSI model.

6. The computing environment of claim 1, wherein, to decrypt the first encrypted data stored by the at least one non-volatile memory to obtain the first data, the second instructions further cause an operating system executed by the second information handling system to decrypt, with the first encryption key of the one or more symmetric encryption keys associated with the first address range of the one or more address ranges, the first encrypted data stored by the at least one non-volatile memory to obtain the first data.

7. The computing environment of claim 1, wherein, to decrypt the first encrypted data stored by the at least one non-volatile memory to obtain the first data, the second instructions further cause a virtual machine executed by the second information handling system to decrypt, with the first encryption key of the one or more symmetric encryption keys associated with the first address range of the one or more address ranges, the first encrypted data stored by the at least one non-volatile memory medium to obtain the first data.

8. A method, comprising:
establishing, by a first information handling system, a root of trust chain associated with the information handling system;
generating, by the first information handling system, one or more encrypted symmetric encryption keys, including encrypting the one or more encrypted symmetric encryption keys via an asymmetric cryptographic process with a private encryption key associated with a public encryption key,
wherein the one or more encrypted symmetric encryption keys are not available outside of the root of trust chain;
receiving, by the first information handling system, a notification from a second information handling system indicating that the second information handling system is ready to proceed with a migration of a memory device to the second information handling system from the first information handling system,
wherein the first information handling system waits for the notification for a threshold time after determining that the memory device has been physically migrated from the first information handling system,
the memory device including at least one volatile memory and at least one non-volatile memory,
wherein the memory device is utilized by the first information handling system to store information in an encrypted fashion;
in response to receiving the notification within a time that is less than the threshold time, extending, by the first information handling system, the root of trust chain to the second information handling system, including providing the public encryption key and the one or more encrypted symmetric encryption keys to the second information handling system;
receiving, via a data link layer of an Open Systems Interconnection (OSI) model by the second information handling system, the public encryption key and the one or more encrypted symmetric encryption keys from the first information handling system;
receiving, via the data link layer of the (OSI) model, by the second information handling system and from the first information handling system, one or more memory address ranges of the memory device and respectively associated one or more encrypted symmetric encryption keys;
decrypting, by the second information handling system, the one or more encrypted symmetric encryption keys, via the asymmetric cryptographic process, to obtain one or more symmetric encryption keys respectively associated with the one or more memory address ranges, wherein the asymmetric cryptographic process utilizes the public encryption key to decrypt the one or more encrypted symmetric encryption keys to obtain the one or more symmetric encryption keys;
physically receiving, by the second information handling system, the memory device,
wherein the first information handling system continues to update, via an application, one or more symmetric encryption keys and their respective address ranges for other memory devices that have not been physically migrated from the first information handling system;
decrypting, by the second information handling system, with a first encryption key of the one or more symmetric encryption keys associated with a first address range of the one or more address ranges, first encrypted data stored by the at least one non-volatile memory to obtain first data; and
decrypting, by the second information handling system, with a second encryption key of the one or more symmetric encryption keys associated with a second address range of the one or more address ranges, second encrypted data stored by the at least one non-volatile memory to obtain second data.

9. The method of claim 8,
wherein the first address range of the memory device is associated with a first virtual machine, and
wherein the second address range of the memory device is associated with a second virtual machine, different from the first virtual machine.

10. The method of claim 8, wherein the memory device includes a non-volatile dual-inline memory module that includes the at least one non-volatile memory and the at least one non-volatile memory.

11. The method of claim 10, wherein the at least one non-volatile memory includes flash memory.

12. The method of claim 8, wherein the receiving, by the second information handling system, the public encryption key from the first information handling system includes receiving, by a baseboard management controller of the second information handling system, the public encryption key from the first information handling system via the data link layer of the Open Systems Interconnection (OSI) model.

13. The method of claim 8, wherein the decrypting with the first encryption key of the one or more symmetric encryption keys associated with the first address range of the one or more address ranges, by the second information handling system, the first encrypted data stored by the at least one non-volatile memory to obtain the first data includes an operating system executed by the second information handling system decrypting with the first encryption key of the one or more symmetric encryption keys associated with the first address range of the one or more address ranges, by the second information handling system, the first encrypted data stored by the at least one non-volatile memory to obtain the first data.

14. The method of claim 8, wherein the decrypting with the first encryption key of the one or more symmetric encryption keys associated with the first address range of the one or more address ranges, by the second information handling system, the first encrypted data stored by the at least one non-volatile memory medium to obtain the first data includes a virtual machine executed by the second information handling system decrypting with the first encryption key of the one or more symmetric encryption keys associated with the first address range of the one or more address ranges, by the second information handling system, the first encrypted data stored by the at least one non-volatile memory to obtain the first data.

15. A non-transitory computer-readable non-transitory memory that includes first instructions;
    wherein, when the first instructions are executed by at least one first processor of a first information handling system, the first instructions cause the first information handling system to:
    establish a root of trust chain associated with the at least one first processor;
    generate one or more encrypted symmetric encryption keys, including encrypting the one or more encrypted symmetric encryption keys via an asymmetric cryptographic process with a private encryption key associated with a public encryption key,
    wherein the one or more encrypted symmetric encryption keys are not available outside of the root of trust chain;
    receive a notification from a second information handling system indicating that the second information handling system is ready to proceed with a migration of a memory device to the second information handling system from the first information handling system, wherein the first information handling system waits for the notification for a threshold time after determining that the memory device has been physically migrated from the first information handling system,
    the memory device including at least one volatile memory and at least one non-volatile memory,
    wherein the memory device is utilized by the first information handling system to store information in an encrypted fashion;
    in response to receiving the notification within a time that is less than the threshold time, extend the root of trust chain to the second information handling system, including providing the public encryption key and the one or more encrypted symmetric encryption keys to the second information handling system;
    wherein, when second instructions are executed by at least one second processor of a second information handling system, the second instructions cause the second information handling system to:
    receive, via a data link layer of an Open Systems Interconnection (OSI) model, the public encryption key and the one or more encrypted symmetric encryption keys from the first information handling system;
    receive, via the data link layer of the (OSI) model, from the first information handling system, one or more memory address ranges of the memory device and respectively associated one or more encrypted symmetric encryption keys; and
    decrypt, via the asymmetric cryptographic process, the one or more encrypted symmetric encryption keys to obtain one or more symmetric encryption keys respectively associated with the one or more memory address ranges,
    wherein the asymmetric cryptographic process utilizes the public encryption key to obtain the one or more symmetric encryption keys;
    wherein the second information handling system is configured to physically receive the memory device,
    wherein the first information handling system continue to update, via an application, one or more symmetric encryption keys and their respective address ranges for other memory devices that have not been physically migrated from the first information handling system; and
    wherein the second instructions further cause the second information handling system to:
    decrypt, with a first encryption key of the one or more symmetric encryption keys associated with a first address range of the one or more address ranges, first encrypted data stored by the at least one non-volatile memory to obtain first data; and
    decrypt, with a second encryption key of the one or more symmetric encryption keys associated with a second address range of the one or more address ranges, second encrypted data stored by the at least one non-volatile memory to obtain second data.

16. The non-transitory computer-readable non-transitory memory of claim 15, wherein the first address range of the memory device is associated with a first virtual machine, and wherein the second address range of the memory device is associated with a second virtual machine, different from the first virtual machine.

17. The non-transitory computer-readable non-transitory memory of claim 15, wherein the memory device includes a non-volatile dual-inline memory module that includes the at least one non-volatile memory and the at least one non-volatile memory.

18. The non-transitory computer-readable non-transitory memory of claim 15, wherein the second information handling system includes a baseboard management controller configured to receive the public encryption key from the first information handling system via the data link layer of the Open Systems Interconnection (OSI) model, wherein, to receive the public encryption key from the first information handling system, the second instructions further cause the baseboard management controller to receive the public encryption key from the first information handling system via the data link layer of the OSI model.

19. The non-transitory computer-readable non-transitory memory of claim 15, wherein, to decrypt with the first encryption key of the one or more symmetric encryption keys associated with the first address range of the one or more address ranges, the first encrypted data stored by the at least one non-volatile memory to obtain the first data, the second instructions further cause an operating system executed by the second information handling system to decrypt with the first encryption key of the one or more symmetric encryption keys associated with the first address range of the one or more address ranges, by the second information handling system, the first encrypted data stored by the at least one non-volatile memory to obtain the first data.

20. The non-transitory computer-readable non-transitory memory of claim 15, wherein, to decrypt with the first encryption key of the one or more symmetric encryption keys associated with the first address range of the one or more address ranges, the first encrypted data stored by the at least one non-volatile memory to obtain the first data, the second instructions further cause a virtual machine executed by the second information handling system to decrypt with the first encryption key of the one or more symmetric encryption keys associated with the first address range of the one or more address ranges, by the second information handling system, the first encrypted data stored by the at least one non-volatile memory to obtain the first data.

\* \* \* \* \*